(12) United States Patent
Palmieri et al.

(10) Patent No.: US 9,591,016 B1
(45) Date of Patent: Mar. 7, 2017

(54) ASSESSING SECURITY RISKS ASSOCIATED WITH CONNECTED APPLICATION CLIENTS

(71) Applicant: International Business Machines Corporation, Armonk, NY (US)

(72) Inventors: David Walsh Palmieri, Cary, NC (US); Gee Ngoo Chia, Morrisville, NC (US); Jeffrey Tobias Robke, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/946,921

(22) Filed: Nov. 20, 2015

(51) Int. Cl.
*H04L 29/06* (2006.01)
*G06F 21/00* (2013.01)
*H04L 29/08* (2006.01)

(52) U.S. Cl.
CPC ........ *H04L 63/1433* (2013.01); *H04L 67/306* (2013.01)

(58) Field of Classification Search
CPC .......................... H04L 63/1433; H04L 67/306
See application file for complete search history.

(56) References Cited

U.S. PATENT DOCUMENTS

| 7,895,448 | B1 * | 2/2011 | Satish | G06F 21/577 713/187 |
|---|---|---|---|---|
| 8,677,448 | B1 * | 3/2014 | Kauffman | G06F 17/30082 726/1 |
| 9,116,888 | B1 * | 8/2015 | Wang | G06F 17/30 |
| 2005/0015628 | A1 | 1/2005 | Narayanan | |
| 2006/0074806 | A1 | 4/2006 | McKegney et al. | |
| 2011/0023107 | A1 | 1/2011 | Chen et al. | |
| 2011/0191200 | A1 * | 8/2011 | Bayer | G06Q 20/12 705/26.1 |
| 2012/0180112 | A1 | 7/2012 | Chen et al. | |
| 2013/0232541 | A1 * | 9/2013 | Kapadia | G06F 21/33 726/1 |

(Continued)

OTHER PUBLICATIONS

Hitachi ID Systems, Inc., "Best Practices for Identity Management Projects," Aug. 2015.

(Continued)

*Primary Examiner* — Lisa Lewis
(74) *Attorney, Agent, or Firm* — Jeffrey S. LaBaw; David H. Judson (57) ABSTRACT

A method for assessing security risks associated with a cloud application to which one or more connected applications are coupled begins by configuring a security risk assessment application to function as a connected application. The security risk assessment application collects "first" data associated with one or more accounts, and "second" data associated with the one or more connected applications coupled to the cloud application. After receiving the first and second data, the security risk assessment application instantiates that data into a generic "data object" that the system uses to represent each account and each of the connected applications. Each such data object thus is populated either with the first data or the second data, depending on whether the data object represents an account or a connected application. A risk assessment is then applied to the generic data object to assess a security risk associated with the cloud application.

20 Claims, 4 Drawing Sheets

(56) References Cited

U.S. PATENT DOCUMENTS

| | | | | |
|---|---|---|---|---|
| 2015/0121461 A1* | 4/2015 | Dulkin | ................ | H04L 63/1408 726/4 |
| 2015/0134954 A1* | 5/2015 | Walley | .................... | H04L 63/08 713/168 |
| 2015/0242623 A1* | 8/2015 | Lindo | .................... | G06F 21/552 726/23 |
| 2015/0310195 A1* | 10/2015 | Bailor | .................... | G06F 21/316 726/6 |
| 2015/0339664 A1* | 11/2015 | Wong | ................. | G06Q 20/3829 705/71 |
| 2016/0057248 A1* | 2/2016 | Tankha | ................. | H04L 67/306 726/6 |
| 2016/0092871 A1* | 3/2016 | Gordon | ................ | G06Q 20/382 705/44 |

OTHER PUBLICATIONS

Kumar, "Integrated Identity and Access Management Governance White Paper," Dec. 2012.
Wikipedia, http://en.wikipedia.org/wiki/Privileged_Identity_Management, Nov. 2015.
Buecker et al, "Centrally Managing and Auditing Privileged User Identities by Using the IBM Integration Services for Privileged Identity Management," IBM Redbooks, 2010.
McDonald, "Privileged Account Management Primer," http://blog.identropy.com/IAM-blog/bid/85344/Privileged-Account-Management-Primer, Jun. 25, 2012.
"Privileged Identity Management for the Cross-Platform Enterprise," http://www.liebsoft.com/privileged_identity_management/, Nov. 2015.

* cited by examiner

ASSESSING SECURITY RISKS ASSOCIATED WITH CONNECTED APPLICATION CLIENTS

BACKGROUND

Technical Field

This disclosure relates generally to the field of digital resource access, and more particularly to assessing security exposures in cloud-based computing environments.

Background of the Related Art

Identity and Access Management Governance is a set of processes and policies for organizations to manage risks and maintain compliance with regulations and policies by administering, securing, and monitoring identities and their access to applications, information, and systems. Although potentially complex in implementation, the concept of Identity and Access Management (IAM) Governance is fairly straightforward: determine who should have access to what resources and who should not, according to government regulations, industry-specific regulations (SOX, HIPPA, GLBA, etc.), and business regulations and guidelines. Typically, key aspects of IAM Governance include access request governance, entitlement certifications, reports and audits, and analytics and intelligence (including role management, entitlement management, separation of duties enforcement, and privileged identity management). An end-to-end IAM Governance solution may also provide related functions, such as access enforcement, user provisioning, password management, and user lifecycle management.

Identity and access management (IAM) systems protect enterprise data and applications with context-based access control, security policy enforcement and business-driven identity governance. These systems may be operated in a standalone manner, in association with cloud-based environments, or in hybrid environments.

An emerging information technology (IT) delivery model is cloud computing, by which shared resources, software and information are provided over the Internet to computers and other devices on-demand. When multiple parties share resources within a cloud computing and other such shared deployment model, a compelling transformation and reduction in their IT costs (from fixed to variable) can be achieved. Using this approach, companies can extend computing and storage capacity elastically to match demand, shift operational and capital costs to an external data center, free IT staff to focus on new projects, and more. Cloud compute resources are typically housed in large server farms that run networked applications, typically using a virtualized architecture wherein applications run inside virtual servers, or so-called "virtual machines" (VMs), that are mapped onto physical servers in a data center facility.

Many cloud applications, such as Salesforce.com, Office 365, and others, provide a way for administrators to allow other applications to access and manage the subject cloud application. An application of this type that has been granted access to a cloud application is known as a "connected application." Typically, the administrator can specify details about the access the connected application should be given, such as access to read but not update data, or perhaps access to create new users in the cloud application. If the administrator is not careful, however, he or she may accidentally give the connected application more access than he intends. Additionally, at some point there may no longer be a valid business reason to continue to allow the connected application access to the cloud application. If an administrator does not take explicit action to terminate the other application's access, it will continue to have access that the administrator no longer intends, possibly exposing the cloud application to security risks (e.g., unintended exposed data, or unintended continued management).

Because these types of "connected applications" are not typically represented as accounts in the cloud application, normal security controls often overlook them. For example, reports related to privileges and dormancy often include only accounts, but not connected applications. Additionally, third party security products often focus on accounts to the exclusion of connected applications.

There remains a need to provide IAM systems with a way to assess security risks that are normally applied to accounts to connected applications.

BRIEF SUMMARY

According to this disclosure, an identity management system is augmented to extend to connected applications the security risk assessment techniques traditionally associated with accounts.

In one embodiment, a method for assessing security risks associated with a cloud application to which one or more connected applications are coupled begins by configuring a security risk assessment application to function as a connected application to the cloud application. This operation enables the security risk assessment application to access and receive data from the cloud application. To this end, the security risk assessment application collects "first" data associated with one or more accounts, and "second" data associated with the one or more connected applications coupled to the cloud application. The first data includes a list of accounts and additional data associated with each account. The second data includes a list of the one or more connected applications coupled to the cloud application and additional data associated with each of the connected applications.

After receiving the first and second data, the security risk assessment application instantiates that data into a generic "data object" that the system uses to represent each account and each of the one or more connected applications. Each such data object thus is populated either with the first data or the second data, depending on whether the data object represents an account or a connected application. A risk assessment is then applied to the generic data object to assess a security risk associated with the cloud application.

In particular, the same risk assessment operation may be applied to both the first data and the second data (namely, to both accounts and connected applications), or the same risk assessment operation may be applied to both accounts and connected applications but with different criteria for evaluation, or a different risk assessment operation may be applied to each of the first and second data (representing the accounts or the connected applications, as the case may be), etc. Generalizing, similar or unique assessments may be performed for both the accounts and the connected applications. In this manner, systems applicable to managing human users (e.g., as represented by IAM accounts) can also manage connected applications. This enable security risk assessments traditionally performed only for accounts to be performed for applications that have been granted access to cloud applications.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
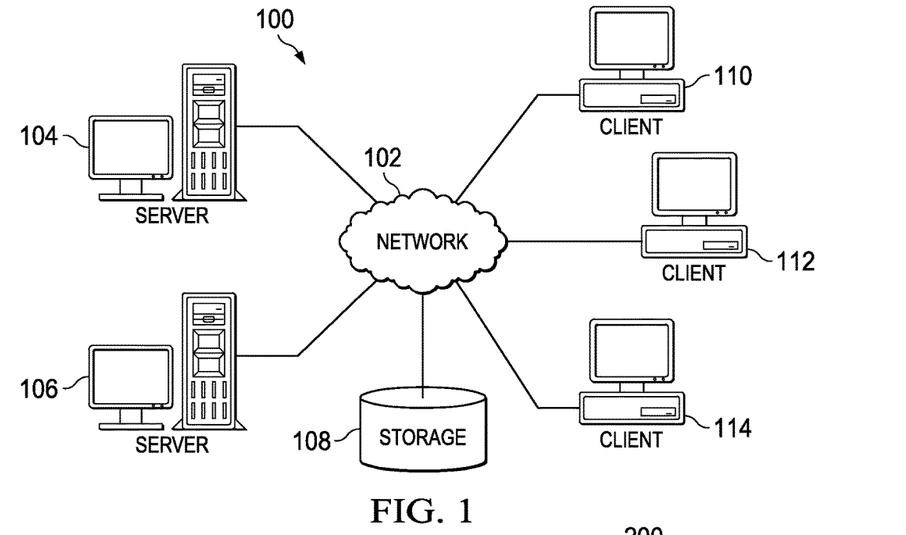
FIG. 1 depicts an exemplary block diagram of a distributed data processing environment in which exemplary aspects of the illustrative embodiments may be implemented.
Figure 2:
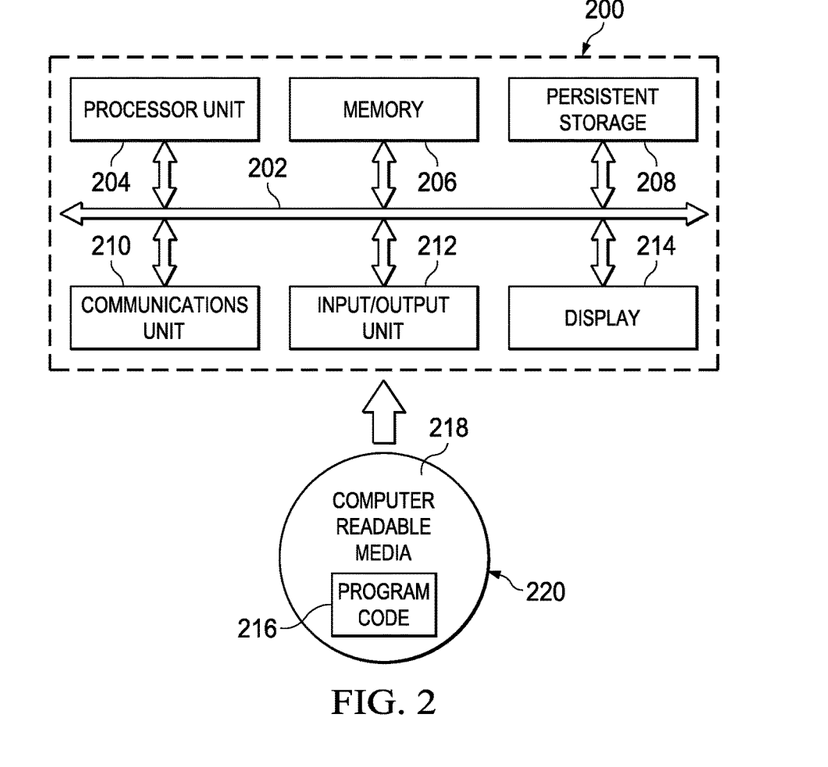
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A cloud computing environment may comprise a set of functional abstraction layers (from bottom to top) as follows: a hardware and software layer, a virtualization layer, a management layer, and a workloads layer.

The hardware and software layer includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The virtualization layer provides an abstraction layer from which the following examples of virtual entities may be provided: virtual servers; virtual storage; virtual networks, including virtual private networks; virtual applications and operating systems; and virtual clients.

The management layer may provide various functions as follows. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Finally, the workloads layer provides examples of functionality for which the cloud computing environment may be utilized. Examples of workloads and functions which may be provided from this layer include: mapping and navigation; software development and lifecycle management; virtual classroom education delivery; data analytics processing; transaction processing.

A representative cloud computing environment typically has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Identity and Access Management

As used herein, an "account" typically refers to an entity that contains a set of parameters that define application-specific attributes of a principal, which include the identity, user profile, and credentials.

"Access" refers the ability to read, update, delete, or otherwise use a resource. Access to protected resources is typically controlled by system software.

A "credential" refers to a declaration of authorization or other security attributes of a subject that is typically validated and signed by a trusted third party. Typically, a credential represents the ID and authenticators (such as a password) for a resource.

An "entitlement" refers to a capability-based reason that a user is given a permission or set of permissions to access IT resources (services).

An "identity" refers to a subset of profile data that uniquely represents a person or entity and that is stored in one or more repositories.

A "dormant account" is an account that has not been used for a given, preferably configurable-time period (e.g., a number of days). A dormant account typically is associated with a service. Preferably, servers in the system are configured to record last login information, and to provide (return) this information upon request. By reconciling the last login information, the system can determine the existence of dormant accounts.

A "dormant account report" lists the accounts that are not recently used, and it may include the service information of the dormant account, the number of days dormant, and a list of accounts dormant as of the report date. Preferably, accounts that do not have last access information are not considered dormant. Accounts that are not dormant include both new accounts for which a Last Access Date field is blank.

An "orphan account" is an account whose owner cannot be automatically determined by the system.

An "ownership type" refers to a category that classifies accounts. One account preferably can have only one type of ownership. Accounts can be marked with different ownership types depending on their use. Default ownership types include, for example, device, personal, system, and vendor.

A "person" is an individual in the system that has a person record in one or more corporate directories.

A "policy" is a set of considerations that influence the behavior of a managed resource or a user.

A "principal" is a person or group that has been granted permissions. It also refers to an entity that can communicate securely with another entity.

In identity management, "provisioning" refers to the process of providing, deploying, and tracking a service or component. To "provision" means to set up and maintain the access of a user to a system, or to create an account on a managed resource.

A "provisioning policy" is a policy that defines the access to various managed resources (services), such as applications or operating systems. Access is granted to all users, users with a specific role, or users who are not members of a specific role.

A "resource" is a hardware, software, or data entity.

A "role" is a logical group of principals that provide a set of permissions. Access to resources is controlled by using provisioning policy to grant access to a role. A role can also represent a group of principals based on business job title or other business-related attributes.

A "service" is a representation of a managed resource, application, database, or system. In an identity management system, typically a service represents the user repository for a managed resource.

A "user" is an individual, organization, process, device, program, protocol, or system that uses the services of a computing system. For example, a user is an individual who uses the identity management system to manage their accounts and passwords, or that is managed by the system.

For many applications, networks, databases and other resources, users are given "access" by an authority or administrative role to enable activity associated with the resource. The conditions and limitations of the access for a given user are referred to as the "access entitlement" of the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative area that utilizes a system to identify individuals with membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered, however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades. In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

It is known in the prior art to provide software and services to deploy policy-based provisioning solutions. These solutions helps companies automate the process of provisioning employees, contractors, and business partners with access rights to the applications they need, whether in a closed enterprise environment or across a virtual or extended enterprise. A known product of this type is IBM® Security Identity Manager.

Figure 3:
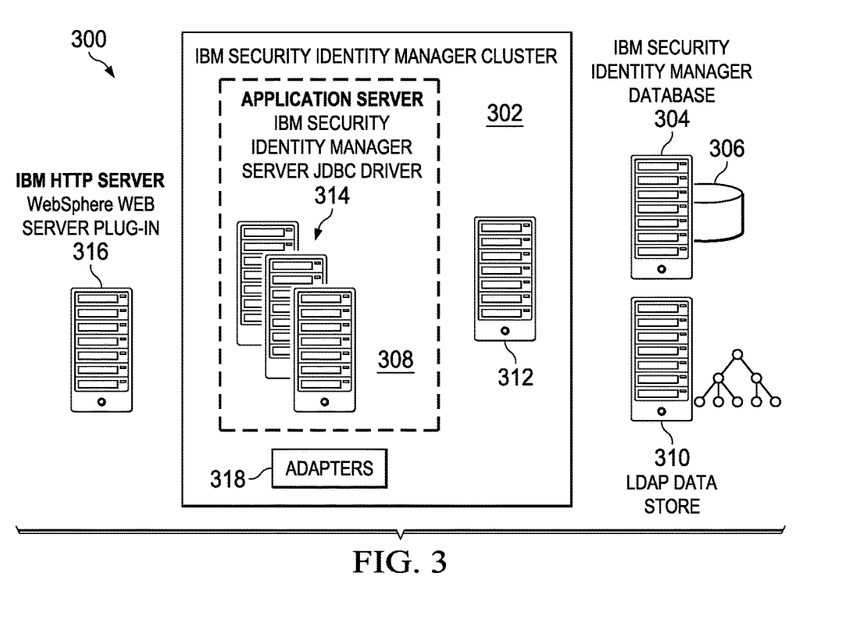
FIG. 3 is a representative security identity management system in which the disclosed subject matter may be implemented.

FIG. 3 is a block diagram of this commercially-available identity manager solution. In one embodiment, as will be described, the techniques of this disclosure may be implemented in such a solution. This identity manager solution, however, is merely representative and should not be taken to limit this disclosure. The representative commercial implementation is known as IBM® Security Identity Manager, Version 6.0. That product manages the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. The solution also affords the ability to add approvals for user requests to access requests. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity driver (JDBC driver) 308. For example, a JDBC driver enables an IBM Security Identity Manager Server to communicate with a data source. IBM Security Identity Manager supports a JDBC type 4 driver to connect a Java-based application to a database. The supported database products are IBM DB2® Database, Oracle DB, and MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server. The solution also preferably includes a directory integrator 312, such as IBM Tivoli Directory Integrator, to synchronize identity data in different directories, databases, and applications. IBM Tivoli Directory Integrator synchronizes and manages information exchanges between applications or directory sources. The solution also includes one or more application servers 314, such as IBM WebSphere® Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager that manages the cluster. The solution also typically includes an HTTP server and WebSphere Web Server plug-in 316. An HTTP server provides administration of IBM Security Identity Manager through a client interface in a web browser. Finally, the solution typically includes one or more IBM Security Identity Manager adapters 318. An adapter is a program that provides an interface between a managed resource and the IBM Security Identity Manager Server. Adapters function as trusted virtual administrators on the target platform for account management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution of this type also may be implemented in whole or in part in a cloud-based solution.

Figure 4:
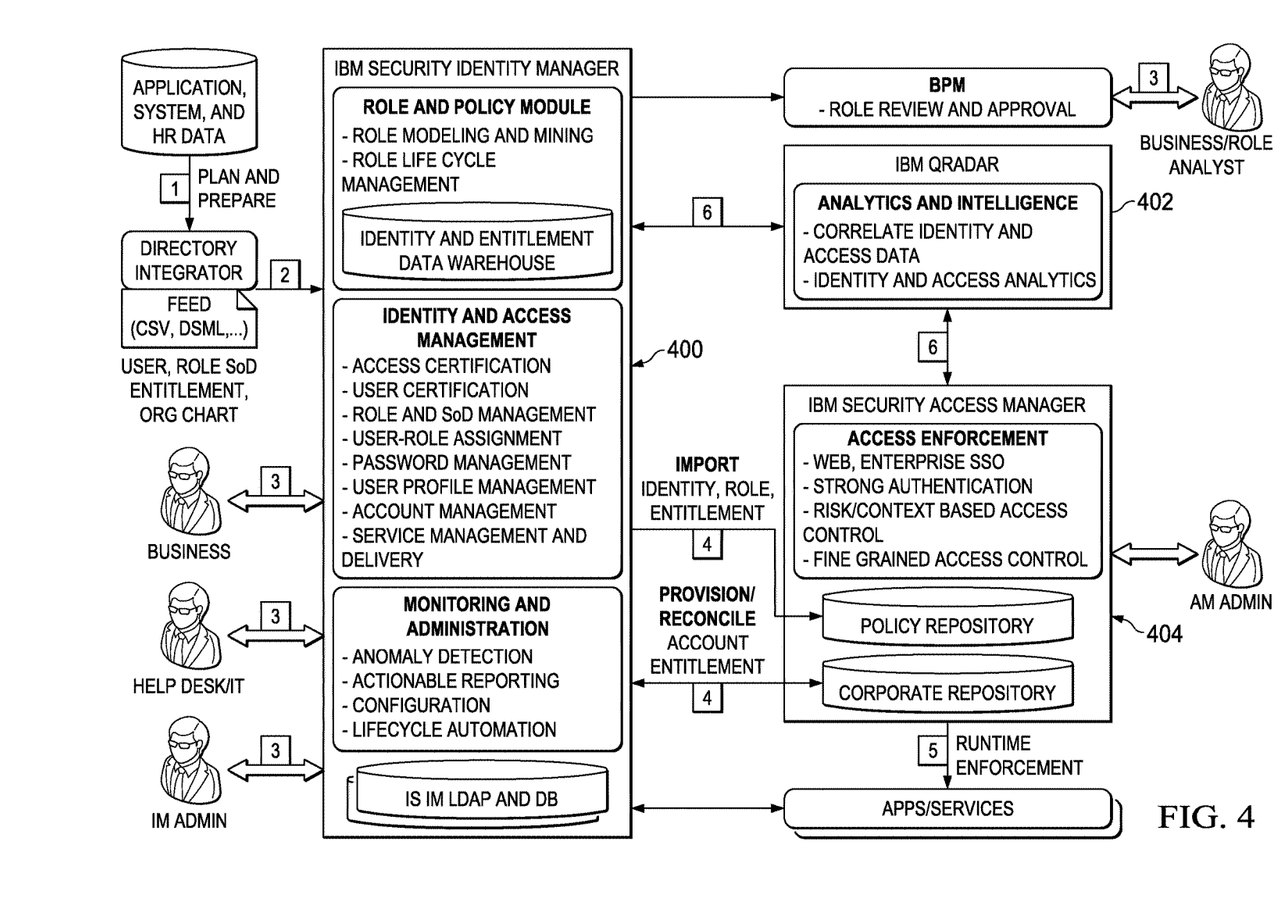
FIG. 4 illustrates a step-by step-guide for implementing IAM governance using an Identity and Access Management system.

FIG. 4 illustrates a representative step-by step-guide for implementing IAM governance using an Identity and Access Management system 400 such as IBM Security Identity Manager. In this embodiment, an end-to-end solution is provided in association with several other systems including a Security Information and Event Management (SIEM) software system 402 (e.g., IBM QRadar®), and an access and entitlement enforcement system (e.g., IBM® Security Access Manager) 404.

At step (1), the enterprise identifies the resources that it wants protected and the accesses it wants certified and monitored. The data is cleaned, filtered, and prepared for loading into the Identity and Access Management system 400 through TDI, LDAP Feed, flat files (CSV, DSML, etc.), or API. At step (2), the data may be loaded into a role and policy module 402 for modeling and management. This data can come from various sources: Human Resources (HR), a planning and modeling tool, or manual entry. In a typical use case, the data gathered during planning is saved (e.g., in a standard CSV file) and then imported into IBM Security Identity Manager for role and policy modeling. The system can export the modeled role and entitlement data (e.g., in XML format) and load it for lifecycle management and certification. At step (3), stakeholders and participants can use the Identity and Access Management system 400 for the various tasks that they must perform, such as requesting accesses and roles, approving access and role requests, certifying, managing, and modeling roles, and reviewing and certifying roles and entitlements. The certification data can be used to clean, adapt, and evolve the system. As step (4), the access and entitlement enforcement system 404 imports or provisions the data from Identity and Access management system 400 into the access and entitlement enforcement systems. At step (5), the enforcement system 404 uses the certified data for runtime enforcement. The SIEM system 402 monitors actual user activity and provides feedback to fine-tune access policy planning, administration, and enforcement.

As illustrated in FIG. 4, one of the responsibilities of the Identity and Access Management system 400 is to provide initial and periodic access certification for continued business needs to help direct and control operations. Access certification typically includes review and certification of user access assignment via role or direct assignment to determine who received access to what, when, and why. It ensures that users have only the privileges and exception entitlements they need to perform their job. Access certification can also be used to detect policy violations, access anomalies, and orphan and dormant accounts. The IAM system typically also maintains certification and access change history, which aids the certification and audit processes.

The system also supports the notion of user to role recertification and user to access recertification according to a recertification policy. Recertification policy simplifies and automates the process of periodically revalidating a target type (account or access) or a membership (role or resource group). Depending on the business needs and the risk level of protected resources, organizations can set a suitable period to perform the scheduled access certification. They can also kick off a certification campaign that is based on-demand or on an event, such as a management event or anomaly detection. The process sends recertification notification (e.g., CBN) and approval events to the participants. A recertification policy includes activities to ensure that users provide confirmation that they have a valid, ongoing need for a specified resource or membership. Typically, the recertification policy also defines the operation that occurs if the recipient declines or does not respond to the recertification request. Recertification policies use a set of notifications to initiate workflow activities in the recertification process. For example, a system administrator of a specific service can create a recertification policy for the service that sets a 90-day interval for account recertification. If the recipient of the recertification declines recertification, the account can be automatically suspended. During the certification process, the system can do bulk or selective certification. For a time-critical certification, the system may provide options to automatically escalate or delegate the action item to an alternate user when timely action is not taken.

Preferably, the system enables certifiers to preview the impact of the certification before submitting it to see if any roles, accounts, or groups are affected by the access decision. Approval and recertification policies deliver change control at the user, role, and access level. Without substantially impacting the business, the change control process can consume any change to the business that affects the user, role, and access structure.

Security products, such as IBM Security Identity Manager, maintain and report information (such as dormancy and privileges) about cloud application accounts, but not for connected applications.

Assessing Security Risks Associated with Connected Application Clients

With the above as background, the subject matter of this disclosure is now described. As noted, a "connected application" is an application that has been granted access to a cloud application. Because the application typically acts as a "client" to the cloud application (or, more generally, a "remote service application"), a connected application also is sometimes referred to herein as a "connected application client." There may be more one or more connected applications associated with a particular cloud application.

As described above, and according to this disclosure, an identity management system is augmented (i.e. extended or supplemented) to extend to connected application clients one or more security risk assessment techniques traditionally associated with accounts. As noted above, an "account" in this context typically refers to an IAM account, namely, an entity that contains a set of parameters that define application-specific attributes of a principal, which include the identity, user profile, and credentials. According to this disclosure, in addition to assessing security risks for a subject cloud application (which involves known IAM functionality associated with accounts), the system is also provided with the capability of assessing security risks for the cloud application that arise from the one or more connected applications that are coupled to the cloud application.

As used herein, a "subject cloud application" is a cloud application to which one or more connected applications are connected (coupled, configured or provisioned), and for which there is a need or desire to assess security risks. The nature of the risk assessment may vary but typically, one or more risk assessments include dormancy, privileges, unintended exposed data, unintended continued management, and any other security risk assessment that may be enabled by the IAM system.

Figure 5:
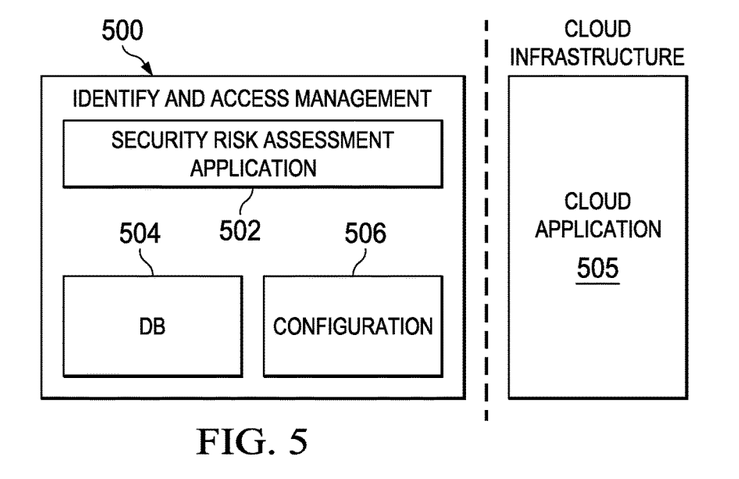
FIG. 5 depicts an IAM system that is augmented to include a security risk assessment application according to this disclosure.

The technique herein assumes that existing interfaces and systems are provided to enable a cloud administrator to configure an application to access a subject cloud application and thus to be a connected application. As noted above, there may be one or more connected applications associated with the cloud application. According to this disclosure, and as depicted in FIG. 5, an IAM system 500 (such as depicted in FIG. 4) is augmented to include a security risk assessment application 502. This application may comprise existing functionality in the IAM system, functionality provided by a standalone application, or some combination thereof. Generalizing, the security risk assessment application typically is software, e.g., one or more computer programs, executing in hardware across one or more machines. Various functions provided by the security risk assessment application 502 may be co-located or remote from one another. One or more databases 504 are associated with the security risk assessment application 502 for holding data and other information. A configuration interface 506, such as web-based interface, may be used to configure the security risk application to the cloud application 505; in the alternative, a system default configuration may be used. The configuration interface 506 provides a user interface (UI) by which a user can create (e.g., specify, identify, change, select) an access policy for the cloud application to 505 thereby form a specification for the security risk assessment application 502, and by which the user can adjust the security risk assessment application as needed.

Figure 6:
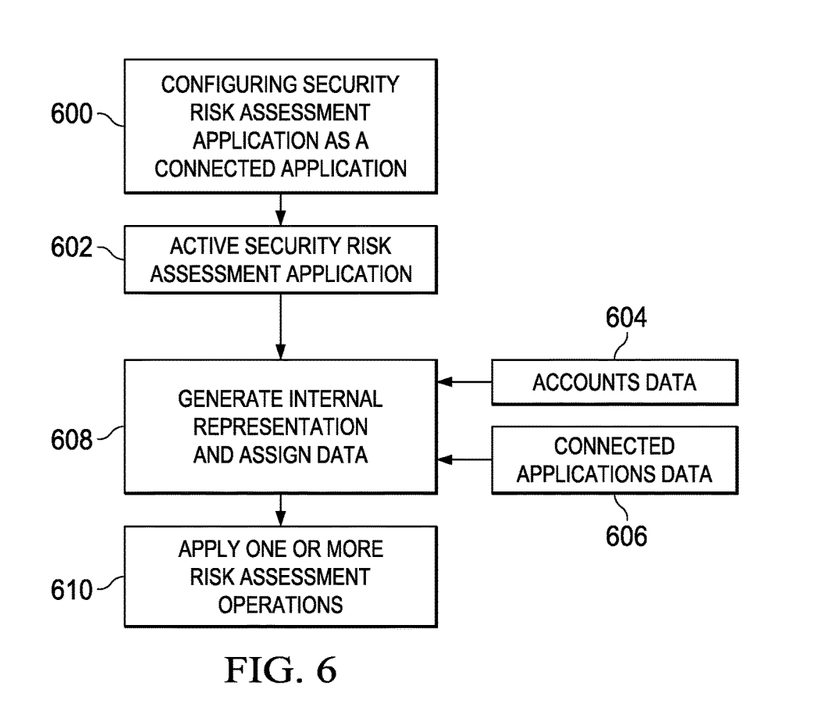
FIG. 6 depicts a process flow of the basic technique of this disclosure.

The security risk assessment application 502 provides for a way to assess security risks for one or more cloud applications, such as cloud application 505. A basic process flow for this technique is depicted in FIG. 6. Typically, there will be a single security risk assessment application 502 associated with a particular cloud application, although this is not a limitation. Thus, there may be multiple instances of the security risk assessment application (e.g., one per cloud application being managed), or multiple different applications, each of which can be configured in the manner now described.

As noted above, the process assumes that there is a target cloud application for which a security risk assessment is desired to be made. There are one or more connected applications presumed to be associated with the target cloud application. The security risk assessment application is used to assess security risks for the target cloud application including those security risks that derive from the connected applications.

To this end, the process begins at step 600 with the administrator of a cloud application (e.g., Salesforce.com, Office 365, or some other) defining the security risk assessment application itself as a connected application to the subject cloud application. This operation allows the security risk assessment application to access data from the cloud application. When configured in this manner, the security risk assessment application (operating as a cloud application client) is able to invoke one or more application programming interfaces (APIs) to gather data, take one or more actions, etc. Communications between the security risk assessment application (or any other connected application) and the cloud application are secured in the usual manner (e.g., via SSL/TLS, private networking, or the like). Configuring an application as a connected application client also affords the security risk assessment application one or more privileges or permissions to the cloud application (e.g., to collect data, makes changes to the system, and the like). Generalizing, step 600 enables the administrator to specify details about the access (to the cloud application) the security risk assessment application should be given.

Following configuration of the security risk assessment application in this manner, the method continues at step 602 with the security risk assessment application activated to assess security risks for the subject cloud application to which it is now a connected application. This is additional functionality that is provided by the technique of this disclosure.

To this end, at step 604, and part of assessing security risks for the subject cloud application, the security risk assessment application accesses from the cloud application "first" data related to accounts. Typically, these are IAM accounts. To this end, step 604 typically involves the security risk assessment application accessing such "first" data as a list of accounts, as well the following for each account: privileges of the account, a last time the account was accessed (e.g., last login), and possibly other data. Additionally, and also as part of assessing security risks for the subject cloud application, at step 606, the security risk assessment application preferably also accesses from the cloud application "second" data related to connected applications. The accessed "second" data typically includes the list of connected applications, as well the following for each connected application: privileges of the connected application, a last time the connected application accessed the cloud application, and possibly other data. Steps 604 and 606 may occur sequentially, concurrently, periodically, asynchronously, in response to a condition or event, or otherwise.

At step 608, and based on the data accessed in steps 604 and 606, the security risk assessment application generates an internal representation of each account and connected application. Preferably, the internal representation is generic to both types (accounts, on the one hand, and connected applications, on the other). In a preferred embodiment, the internal representation is a generic object comprising a data set. By representing accounts and connected applications by the same generic object (or object type), the IAM system is able to apply security risk assessment methods and operations to both types of entities. This is highly advantageous, as it enables the IAM system to treat the accounts and connected applications the same way in some respects, but also with differences where appropriate so that accounts and connected applications also can be differentiated.

Thus, the security risk assessment application collects "first" data associated with one or more accounts, and "second" data associated with the one or more connected applications coupled to the cloud application. The security risk assessment application (or some other system component) then generates a data object that represents each account and each of the one or more connected applications, with the data object populated with one of: the first data and the second data, depending on the whether an account is being represented, or whether a connected application is being represented by the data object. Once the first and second data has been represented in this manner (which may involve a data transformation with respect to the second data), the resulting data object can be acted upon by one or more security risk assessment functions or operations.

To that end, and at step 610, the security risk assessment application then assesses risk for accounts and connected applications, preferably using some common techniques for both types, some techniques specific to accounts, and some techniques specific to connected applications. The nature of the operation in step 610 depends on the security risk assessment function (e.g., dormancy, privileges, etc.) and which of the types (accounts, or connected applications) are being analyzed.

For example, and not by way of limitation, risk assessment for dormancy may be performed the same way for accounts and connected applications. The results of the dormancy risk assessment preferably would include information (a token, an identifier, etc.) that allows the user to differentiate accounts from connected applications.

As another example, risk assessment for privileges may be performed the same way for accounts and connected applications, or different criteria can be applied. For example, the threshold for categorizing an account as privileged or risky might be different than a connected application, but preferably the general assessment approach can be the same.

As yet another example, some unique risk assessments might be performed only for accounts, while other unique risk assessments might be performed only for connected applications. For example, the risk associated with the expiration date of an OAuth token might be performed only for a connected application, as that token might not apply to accounts in the cloud application The above are merely representative example scenarios but they represent an important advantage of the technique of this disclosure, namely, the ability of the IAM system to apply its standard risk assessment methodologies to both accounts and connected applications.

The following describes a process flow corresponding to one example implementation scenario for step 610 (in FIG. 6). The process flow may iterate over one or more data objects. At a first step, the data object is obtained. At a next step, the data object is classified or otherwise identified as being associated with an account or a connected application. At a following step, a "common" assessment (one that is carried out for both accounts and connected applications) is performed. During the common assessment step, different criteria may be applied depending on whether the data object is an account or a connected application. An account-specific assessment is performed if the data object represents an account. An application-specific assessment is performed if the data object represents a connected application. The common assessment step and the account-specific or application-specific assessments may be carried out concurrently or asynchronously, or in response to one or more conditions or events. This process flow is merely exemplary of one possible implementation scenario.

Thus, according to an embodiment of this disclosure, an IAM system is enhanced to treat a connected application-to-cloud application (or, more generally, any application-to-application (A2A) connectivity) as an internal construct within the IAM system that can be managed in the same way as an account is managed by the system. As such, and as represented by step 610, one or more IAM-based rules, policies, methods or operations are then applied to assess security risks for the cloud application (or, more generally, the connected-to application) by virtue of the A2A connectivity. Thus, for example, the IAM system may identify the connected application as dormant, or may require re-certification of the connected application after a given period of inactivity, etc. In this manner, conventional IAM processing is applied to assess the security risk(s) to the target cloud application of the connected application. Once the connected application is generalized by the internal representation, conventional IAM rules are applied. As needed, governance holes are identified, and remedial action can be taken. One remedial action, for example is severing the connected application connectivity.

A representative "data object" may be implemented as data structure that comprises a set of attributes, such as "name," "type," "last usage" and "entitlements," and their associated values. For an account, an attribute "name" might be populated with a user ID; for a connected application, the attribute name might be populated with the name of the connected application. The attribute "type" takes the value "account" or "connected application." For an account, an attribute "last usage" might be populated with the date and time that the user last logged into the cloud application; for a connected application, this attribute might be populated with the date and time when the connected application last accessed the cloud application. The "entitlements" attribute typically is a collection of the entitlements the account or connected application has on the cloud application. These entitlements might include, for example, create documents, read documents, edit documents, delete documents, create users, change password, read user data, and so forth. The data structure may be an array, a linked list, or any other data structure.

The techniques of this disclosure provide several advantages. Foremost, the approach extends known systems applicable to managing human users (e.g., IAM accounts) to manage connected applications. This enables security risk assessments traditionally performed only for accounts to be performed for connected applications that have been granted access to cloud applications even though those connected applications are not represented as accounts in the cloud application. As a by-product, the techniques of this disclosure enable more robust detection of risks and vulnerabilities involved when connected applications use cloud applications.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The security risk assessment application, an associated administration page, or the workflow functions (or components thereof) may be hosted in the cloud as well.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the security risk assessment application components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, identity access and management systems, as well as improvements to security risk assessment systems that operate in association therewith.

As used here, a "connected application" or "connected application client" may be generalized to any Internet-of-Things (IoT)-based device, appliance, machine, mechanism, product or system. In this manner, the described technique is useful to enable security risk assessment techniques traditionally associated with IAM accounts to be any IoT client.

The teachings recited herein are not limited to a cloud computing environment. Rather, embodiments of the disclosed subject matter are capable of being implemented in conjunction with any other type of remote services computing environment now known or later developed.

Having described our invention, what we now claim is as follows.

The invention claimed is:

1. A method for assessing security risks associated with a cloud application to which one or more connected applications are coupled, comprising:
   configuring a security risk assessment application to function as a connected application to the cloud application, wherein a connected application is an application that has been granted access to the cloud application with one or more privileges or permissions to collect data and manage the cloud application;
   collecting, by the security risk assessment application, first data associated with one or more accounts, and second data associated with the one or more connected applications coupled to the cloud application, wherein at least one account is an identity and access management (IAM) account that is an entity that includes a set of parameters defining application-specific attributes of a principal;
   generating, by the security risk assessment application, multiple data objects of a same type, wherein each account is represented by one of the multiple data objects, and wherein each connected application is represented by one of the multiple data objects, wherein a data object that represents an account is populated with the first data, wherein a data object that represents a connected application is populated with the second data; and
   applying a risk assessment to a particular data object to assess a security risk associated with the cloud application.

2. The method as described in claim 1 wherein the first data includes a list of accounts and additional data associated with at least one account.

3. The method as described in claim 1 wherein the second data includes a list of the one or more connected applications coupled to the cloud application and additional data associated with at least one of the connected applications.

4. The method as described in claim 1 wherein applying the risk assessment to the data object applies a same risk assessment operation to both the first data and the second data.

5. The method as described in claim 1 wherein applying the risk assessment to the data object applies a different risk assessment operation to each of the first data and the second data.

6. The method as described in claim 1 wherein applying the risk assessment to the data object applies a same risk assessment operation to both the first data and the second data but with distinct evaluation criteria.

7. The method as described in claim 1 wherein at least one connected application coupled to the cloud application is an Internet-of-Things (IoT) client.

8. An apparatus, comprising:
   a processor;
   computer memory holding computer program instructions executed by the processor to assess security risks associated with a cloud application to which one or more connected applications are coupled, the computer program instructions comprising a security risk assessment application operative to:
configure the security risk assessment application to function as a connected application to the cloud application, wherein a connected application is an application that has been granted access to the cloud application with one or more privileges or permissions to collect data and manage the cloud application;
collect first data associated with one or more accounts, and second data associated with the one or more connected applications coupled to the cloud application, wherein at least one account is an identity and access management (IAM) account that is an entity that includes a set of parameters defining application-specific attributes of a principal;
generate multiple data objects of a same type, wherein each account is represented by one of the multiple data objects, and wherein each connected application is represented by one of the multiple data objects, wherein a data object that represents an account is populated with the first data, wherein a data object that represents a connected application is populated with the second data; and
apply a risk assessment to a particular data object to assess a security risk associated with the cloud application.

9. The apparatus as described in claim 8 wherein the first data includes a list of accounts and additional data associated with at least one account.

10. The apparatus as described in claim 8 wherein the second data includes a list of the one or more connected applications coupled to the cloud application and additional data associated with at least one of the connected applications.

11. The apparatus as described in claim 8 wherein the risk assessment applies a same risk assessment operation to both the first data and the second data.

12. The apparatus as described in claim 8 wherein the risk assessment applies a different risk assessment operation to each of the first data and the second data.

13. The apparatus as described in claim 8 wherein the risk assessment applies a same risk assessment operation to both the first data and the second data but with distinct evaluation criteria.

14. The apparatus as described in claim 8 wherein at least one connected application coupled to the cloud application is an Internet-of-Things (IoT) client.

15. A computer program product in a non-transitory computer readable medium for use in a data processing system, the computer program product holding computer program instructions which, when executed by the data processing system, assess security risks associated with a cloud application to which one or more connected applications are coupled, the computer program instructions comprising a security risk assessment application operative to:
configure the security risk assessment application to function as a connected application to the cloud application, wherein a connected application is an application that has been granted access to the cloud application with one or more privileges or permissions to collect data and manage the cloud application;
collect first data associated with one or more accounts, and second data associated with the one or more connected applications coupled to the cloud application, wherein at least one account is an identity and access management (IAM) account that is an entity that includes a set of parameters defining application-specific attributes of a principal;
generate multiple data objects of a same type, wherein each account is represented by one of the multiple data objects, and wherein each connected application is represented by one of the multiple data objects, wherein a data object that represents an account is populated with the first data, wherein a data object that represents a connected application is populated with the second data; and
apply a risk assessment to a particular data object to assess a security risk associated with the cloud application.

16. The computer program product as described in claim 15 wherein the first data includes a list of accounts and additional data associated with at least one account.

17. The computer program product as described in claim 15 wherein the second data includes a list of the one or more connected applications coupled to the cloud application and additional data associated with at least one of the connected applications.

18. The computer program product as described in claim 15 wherein the risk assessment applies a same risk assessment operation to both the first data and the second data.

19. The computer program product as described in claim 15 wherein the risk assessment applies a different risk assessment operation to each of the first data and the second data.

20. The computer program product as described in claim 15 wherein the risk assessment applies a same risk assessment operation to both the first data and the second data but with distinct evaluation criteria.

\* \* \* \* \*